US012634528B2

(12) United States Patent
Lin et al.

(10) Patent No.: US 12,634,528 B2
(45) Date of Patent: May 19, 2026

(54) METHOD FOR PREVENTING FALSE TRIGGERING OF LIVE BROADCASTING RISK CONTROL, COMPUTER DEVICE, AND PRODUCT

(71) Applicants:Guangzhou Overseas Kangbazi Network Technology Co., Ltd., Guangzhou (CN); GUANGZHOU HUADUO NETWORK TECHNOLOGY CO., LTD., Guangzhou (CN)

(72) Inventors: Xuhong Lin, Guangzhou (CN); Yingqi Wang, Guangzhou (CN); Xiong Xiong, Guangzhou (CN)

(73) Assignees: Guangzhou Overseas Kangbazi Network Technology Co., Ltd., Guangzhou (CN); GUANGZHOU HUADUO NETWORK TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/011,888

(22) Filed: Jan. 7, 2025

(65) Prior Publication Data
US 2025/0150647 A1 May 8, 2025

(30) Foreign Application Priority Data
Mar. 13, 2024 (CN) ........................ 202410286589.X

(51) Int. Cl.
*H04N 21/2187* (2011.01)
*G06T 7/70* (2017.01)
(Continued)

(52) U.S. Cl.
CPC ........... *H04N 21/2187* (2013.01); *G06T 7/70* (2017.01); *H04N 21/23424* (2013.01); *H04N 21/2542* (2013.01); *H04N 21/816* (2013.01)

(58) Field of Classification Search
CPC ............. H04N 21/2187; H04N 21/854; H04N 21/8146; H04N 21/4312; H04N 21/4788
See application file for complete search history.

(56) References Cited

U.S. PATENT DOCUMENTS

2019/0197442 A1* 6/2019 Lu ........................ G06N 3/0895
2020/0151578 A1* 5/2020 Chen ...................... G06N 3/047
(Continued)

FOREIGN PATENT DOCUMENTS

CN       113825031       12/2021
CN       114363712        4/2022
(Continued)

*Primary Examiner* — Jason Salce
(74) *Attorney, Agent, or Firm* — ScienBiziP, P.C.

(57) ABSTRACT
The present application relates to a method for preventing a false triggering of a live streaming risk control, a device, and a product, the method includes responding to an instruction of starting a virtual live streaming, starting an e-commerce live streaming room on an e-commerce platform; obtaining a speech list from a speech server, the speech list including speech texts corresponding to business links of a same live streaming business process; generating a portrait oral video corresponding to each of the speech texts based on a template video, the template video having a preset required duration, and each image frame of the template video comprising a facial image collected based on a same person; implementing a virtual live streaming activity by pushing the portrait oral video corresponding to each speech text to the e-commerce live streaming room, according to the live streaming business process.

20 Claims, 5 Drawing Sheets

(51) Int. Cl.
    *H04N 21/234*        (2011.01)
    *H04N 21/254*        (2011.01)
    *H04N 21/81*         (2011.01)

(56)          References Cited

U.S. PATENT DOCUMENTS

| | | | |
|---|---|---|---|
| 2023/0289828 A1* | 9/2023 | Yu | G06Q 10/0635 |
| 2025/0142138 A1* | 5/2025 | Zhang | H04N 21/4758 |
| 2025/0150647 A1* | 5/2025 | Lin | H04N 21/816 |
| 2025/0175680 A1* | 5/2025 | Bai | H04N 21/41 |
| 2025/0316012 A1* | 10/2025 | Chen | G06T 11/00 |

FOREIGN PATENT DOCUMENTS

| | | |
|---|---|---|
| CN | 116152888 | 5/2023 |
| CN | 118158450 | 6/2024 |
| JP | 7125729 | 8/2022 |

* cited by examiner

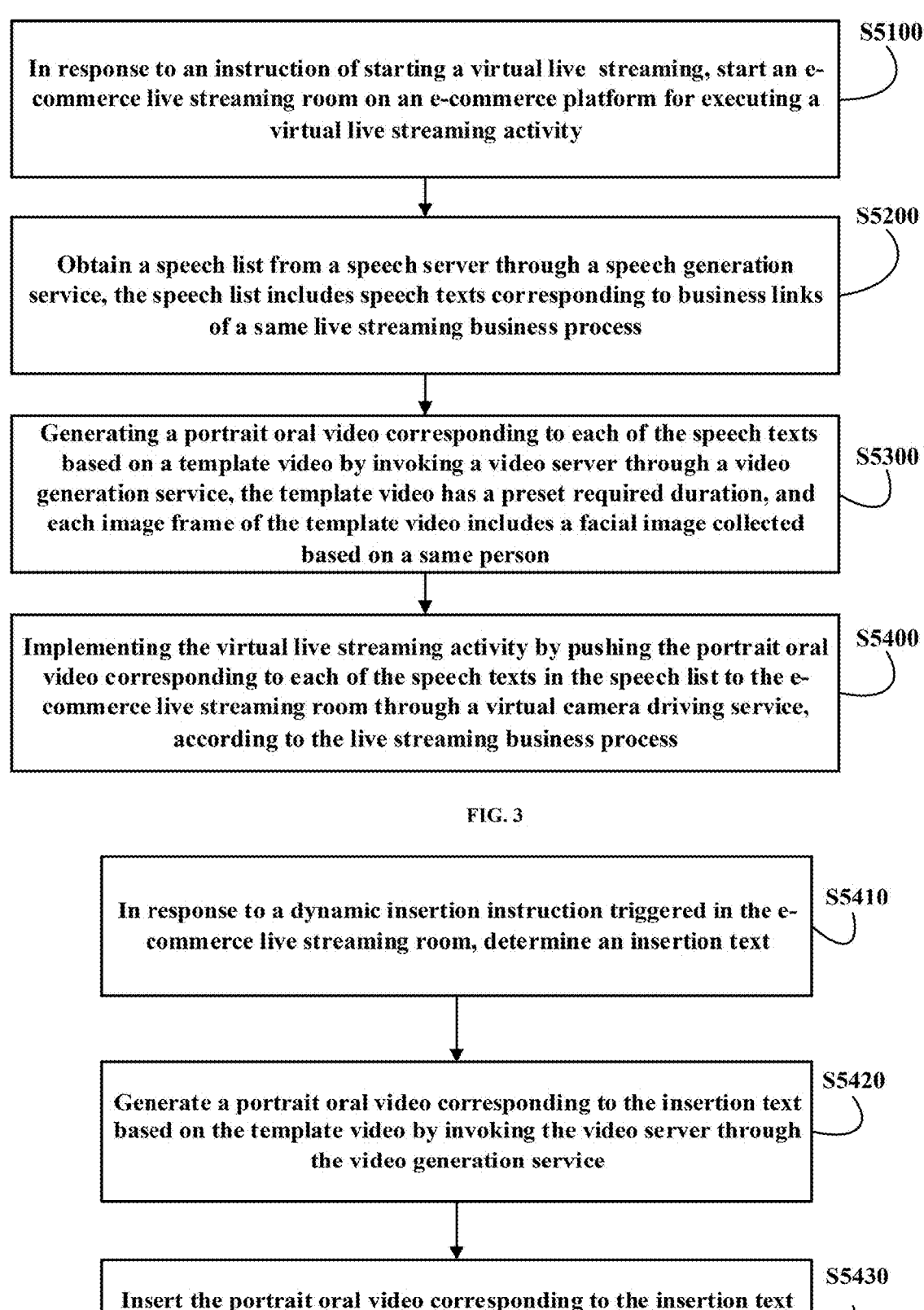

In response to an instruction of starting a virtual live streaming, start an e-commerce live streaming room on an e-commerce platform for executing a virtual live streaming activity

S5100

Obtain a speech list from a speech server through a speech generation service, the speech list includes speech texts corresponding to business links of a same live streaming business process

S5200

Generating a portrait oral video corresponding to each of the speech texts based on a template video by invoking a video server through a video generation service, the template video has a preset required duration, and each image frame of the template video includes a facial image collected based on a same person

S5300

Implementing the virtual live streaming activity by pushing the portrait oral video corresponding to each of the speech texts in the speech list to the e-commerce live streaming room through a virtual camera driving service, according to the live streaming business process

In response to a dynamic insertion instruction triggered in the e-commerce live streaming room, determine an insertion text

S5410

Generate a portrait oral video corresponding to the insertion text based on the template video by invoking the video server through the video generation service

S5420

Insert the portrait oral video corresponding to the insertion text after the portrait oral video, which is being pushed to the e-commerce live streaming room

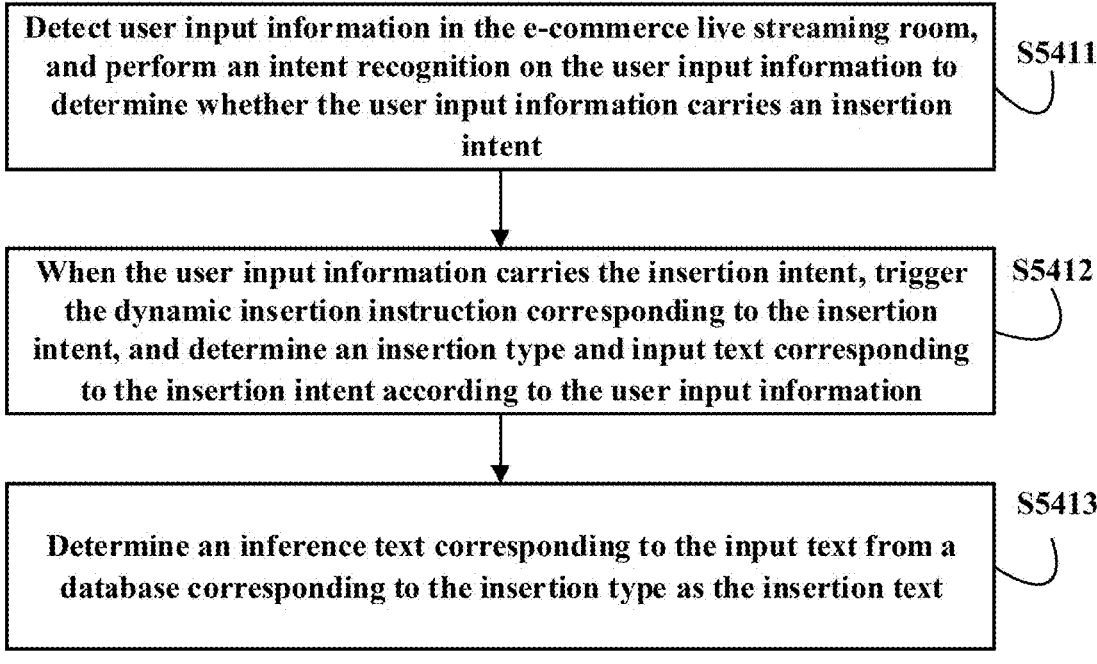

Detect user input information in the e-commerce live streaming room, and perform an intent recognition on the user input information to determine whether the user input information carries an insertion intent — S5411

When the user input information carries the insertion intent, trigger the dynamic insertion instruction corresponding to the insertion intent, and determine an insertion type and input text corresponding to the insertion intent according to the user input information — S5412

Determine an inference text corresponding to the input text from a database corresponding to the insertion type as the insertion text — S5413

FIG. 5

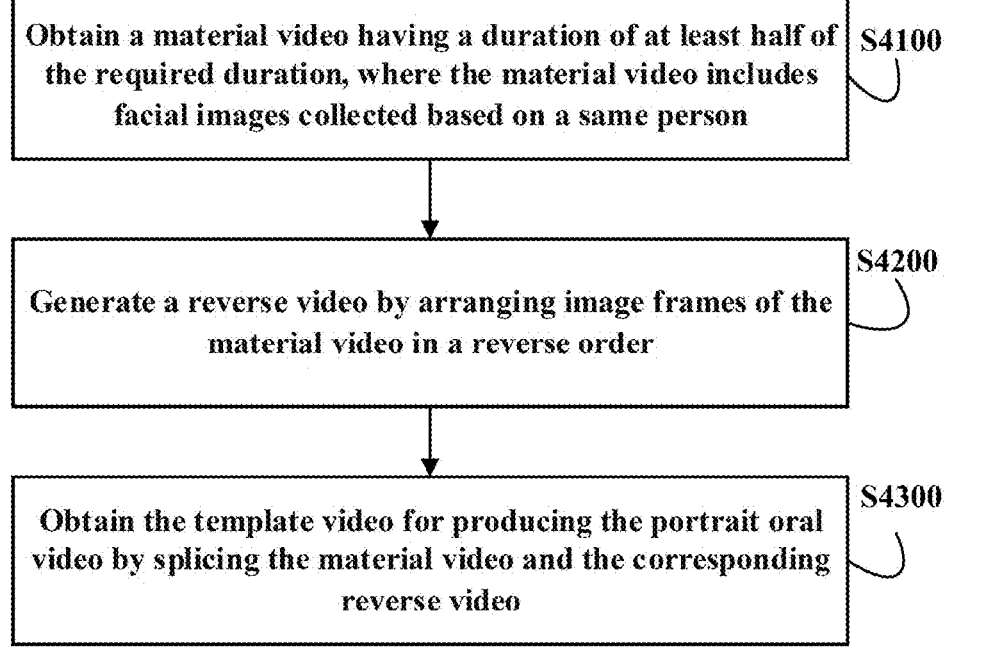

Obtain a material video having a duration of at least half of the required duration, where the material video includes facial images collected based on a same person — S4100

Generate a reverse video by arranging image frames of the material video in a reverse order — S4200

Obtain the template video for producing the portrait oral video by splicing the material video and the corresponding reverse video — S4300

FIG. 6

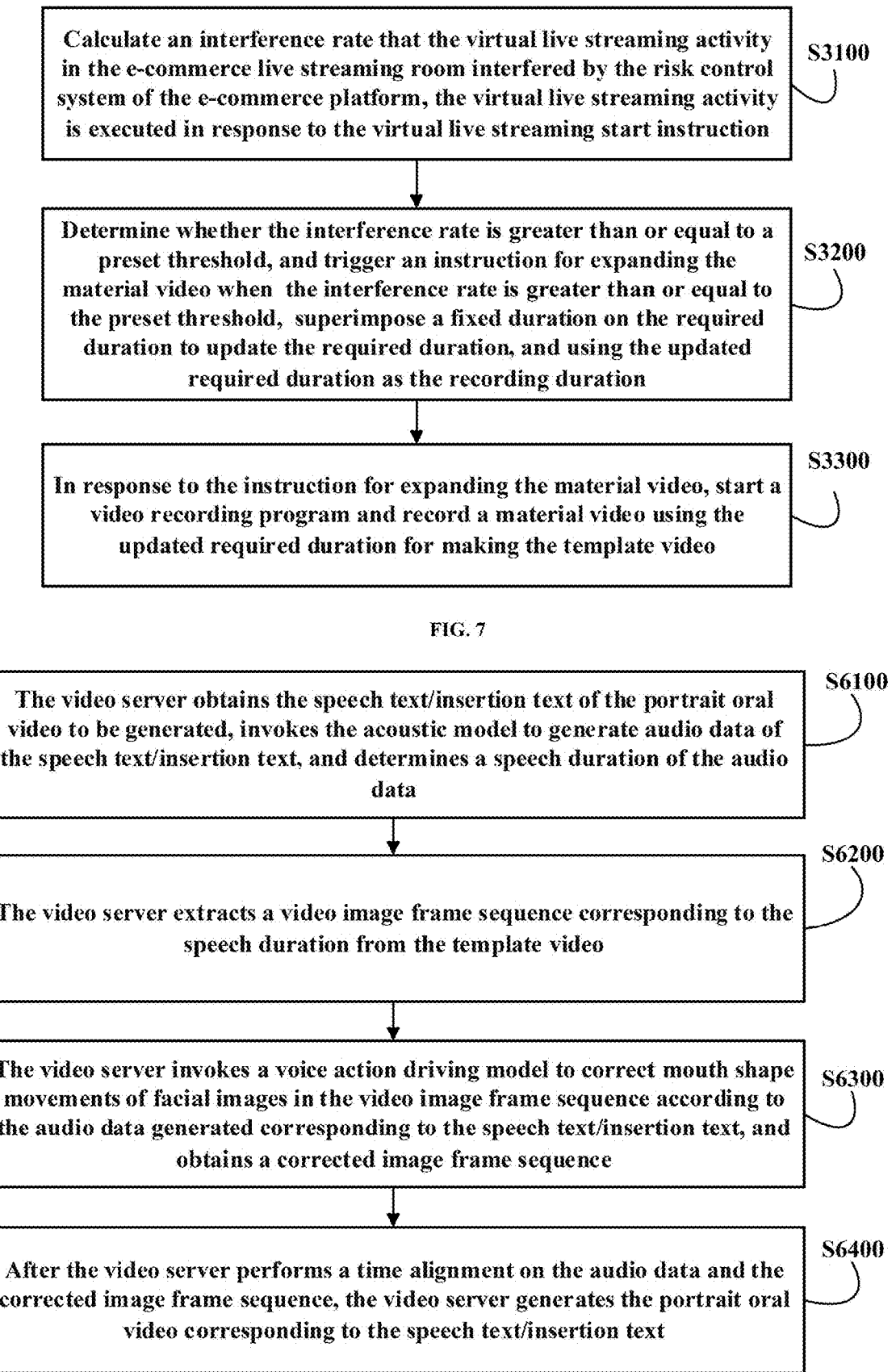

Calculate an interference rate that the virtual live streaming activity in the e-commerce live streaming room interfered by the risk control system of the e-commerce platform, the virtual live streaming activity is executed in response to the virtual live streaming start instruction ⟩ S3100

Determine whether the interference rate is greater than or equal to a preset threshold, and trigger an instruction for expanding the material video when the interference rate is greater than or equal to the preset threshold, superimpose a fixed duration on the required duration to update the required duration, and using the updated required duration as the recording duration ⟩ S3200

In response to the instruction for expanding the material video, start a video recording program and record a material video using the updated required duration for making the template video ⟩ S3300

FIG. 7

The video server obtains the speech text/insertion text of the portrait oral video to be generated, invokes the acoustic model to generate audio data of the speech text/insertion text, and determines a speech duration of the audio data ⟩ S6100

The video server extracts a video image frame sequence corresponding to the speech duration from the template video ⟩ S6200

The video server invokes a voice action driving model to correct mouth shape movements of facial images in the video image frame sequence according to the audio data generated corresponding to the speech text/insertion text, and obtains a corrected image frame sequence ⟩ S6300

After the video server performs a time alignment on the audio data and the corrected image frame sequence, the video server generates the portrait oral video corresponding to the speech text/insertion text ⟩ S6400

FIG. 8

METHOD FOR PREVENTING FALSE TRIGGERING OF LIVE BROADCASTING RISK CONTROL, COMPUTER DEVICE, AND PRODUCT

TECHNICAL FIELD

The present application relates to a field of e-commerce information security technology, and in particular to a method for preventing false triggering of live streaming risk control, an apparatus, a device, and a product.

BACKGROUND

E-commerce platforms are equipped with risk control systems to identify various non-compliant behaviors of e-commerce users so that corresponding regulatory actions may be taken in a timely manner to maintain information security of the e-commerce platforms. With a development of online live streaming technology, e-commerce platforms and the online live streaming technology have been deeply integrated, and various e-commerce platforms have gradually strengthened a security control of e-commerce live streaming activities, such as identifying behaviors of merchant users using robots to perform repetitive live streaming on behalf of others, so as to promptly detect non-compliant behaviors of live streaming and ensure a quality of live streaming content provided by e-commerce platforms.

Virtualized person live streaming, also known as digital human live streaming, is increasingly widely used in online live streaming. Different from robot live streaming, the virtualized person live streaming is a technology that uses text or voice to drive to generate video streams for live streaming. This video stream contains image content corresponding to information content played orally by a specific person. The information content that needs to be played orally may be customized in advance or determined in real time. Therefore, the virtualized person live streaming is a relatively real-time video dynamic generation technology. When the video stream corresponding to a virtual person is pushed to a live streaming room for playback, a virtual live streaming activity may be performed.

A video stream in the virtual live streaming activity is usually driven and generated based on a material video of a certain length, and image frames in the material video are always limited. When it takes a long time to generate the video stream required for live streaming, due to a lag in the risk control system, the risk control system is likely to misidentify the video stream in the virtual live streaming activity as a living streaming behavior of a robot, and make incorrect interference in the virtual live streaming activity, such as suspending or banning it, etc., resulting in an inability to carry out the e-commerce live streaming activity normally, causing huge losses to e-commerce stores and the e-commerce platform, and also taking poor user experience. At the same time, it limits the development of a new technology of the virtualized person live streaming. Therefore, it is necessary to improve a technology related to the virtual live streaming activity in combination with a technical defect of the risk control system.

SUMMARY

The purpose of this application is to provide a method for preventing false triggering of live streaming risk control, an apparatus, a device, and a product.

According to one aspect of the present application, a method for preventing a false triggering of a live streaming risk control is provided. The method comprises: responding to an instruction of starting a virtual live streaming, starting an e-commerce live streaming room on an e-commerce platform for executing a virtual live streaming activity; obtaining a speech list from a speech server through a speech generation service, the speech list comprising speech texts corresponding to business links of a same live streaming business process; generating a portrait oral video corresponding to each of the speech texts based on a template video by invoking a video server through a video generation service, the template video having a preset required duration, and each image frame of the template video comprising a facial image collected based on a same person; and implementing the virtual live streaming activity by pushing the portrait oral video corresponding to each of the speech texts in the speech list to the e-commerce live streaming room through a virtual camera driving service, according to the live streaming business process.

According to another aspect of the present application, an apparatus for preventing a false triggering of a live streaming risk control is provided. The apparatus comprises: a live streaming response module, being configured to respond to an instruction of starting a virtual live streaming and start an e-commerce live streaming room on the e-commerce platform for executing a virtual live streaming activity; a speech acquisition module, being configured to obtain a speech list from a speech server through a speech generation service, the speech list comprising speech texts corresponding to business links in a same live streaming business process; a video acquisition module, being configured to generate a portrait oral video corresponding to each of the speech texts based on a template video by invoking a video server through a video generation service, the template video having a preset required duration, and each image frame of the template video comprising a facial image collected based on a same person; and a live streaming module, being configured to implement the virtual live streaming activity by pushing the portrait oral video corresponding to each of the speech texts in the speech list to the e-commerce live streaming room through a virtual camera driving service, according to the live streaming business process.

According to another aspect of the present application, a computer device is provided. The computer device comprises a processor and a storage device, wherein the processor invokes and runs a computer program stored in the storage device to execute the method for preventing the false triggering of the live streaming risk control.

According to another aspect of the present application, a non-transitory storage medium is provided. The non-transitory storage medium stores a computer program which when executed by a processor of a computer device, the method for preventing the false triggering of the live streaming risk control is realized.

According to another aspect of the present application, a computer program product is provided. The computer program product comprises a computer program/instruction which when executed by a processor, the method for preventing the false triggering of the live streaming risk control is realized.

Compared with the prior art, when a live streaming user starts a live streaming room to perform a virtual live streaming activity, the present application first invokes the speech list from the speech server through the speech generation service to obtain the speech texts corresponding to the various business links of the same live streaming business process, and then uses the video generation service to drive the video server to instantly generate the portrait oral video corresponding to each speech text according to the template video having the preset required duration, and finally pushes these portrait oral videos to the e-commerce live streaming room through the virtual camera driving service to implement the virtual live streaming activity.

Based on this, many advantages of the present application may be reflected and includes the following: in a dynamic recognition mechanism, the template video that meets the required duration may enrich and generalize motion features of the facial images of the people in the portrait oral video corresponding to each speech text, thereby reducing the frequency of the risk control system discovering repeated motion features; in a static recognition mechanism, the virtual camera driving service avoids an inherent defect of the risk control system in mechanically judging robot's proxy live streaming behavior through data source.

It may be seen that through a coordination of these two aspects, this application may effectively avoid the virtual live streaming activity from being misidentified as robot live streaming behavior by the risk control system of the e-commerce platform, whether from the dynamic identification mechanism or the static identification mechanism, thereby reducing the frequency of the risk control system's mistakenly triggering interference behavior against the virtual live streaming activity of the e-commerce live streaming room, improving a stability and a security of the virtual live streaming activity, and avoiding unnecessary economic losses for the e-commerce stores to which the e-commerce live streaming room belongs. At the same time, it may also escort the application of a virtualized person live streaming in the e-commerce field and remove obstacles to an application of the virtualized person live streaming in the e-commerce field.

BRIEF DESCRIPTION OF THE DRAWINGS

In order to more clearly illustrate technical solutions in the embodiments of the present application, the drawings required for use in a description of the embodiments will be briefly introduced below. Obviously, the drawings described below are only some embodiments of the present application. For the skilled in the art, other drawings may be obtained based on these drawings without creative work.

FIG. 3 is a schematic diagram of a flow chart of a method for preventing a false triggering of a live streaming risk control provided by one embodiment of the present application;

FIG. 4 is a schematic diagram of a flow chart of inserting a portrait oral video in response to a dynamic insert instruction provided by one embodiment of the present application;

FIG. 5 is a schematic diagram of a flow chart of determining an insertion text according to user input information provided by one embodiment of the present application;

FIG. 6 is a schematic diagram of a flow chart of making a template video provided by one embodiment of the present application;

FIG. 7 is a schematic diagram of a flow chart of making a template video according to a guidance of an interference rate of a risk control system provided by one embodiment of the present application;

FIG. 8 is a schematic diagram of a flow chart of a video server generates a corresponding portrait oral video according to a speech text provided by one embodiment of the present application;

DETAILED DESCRIPTION

Figure 1:
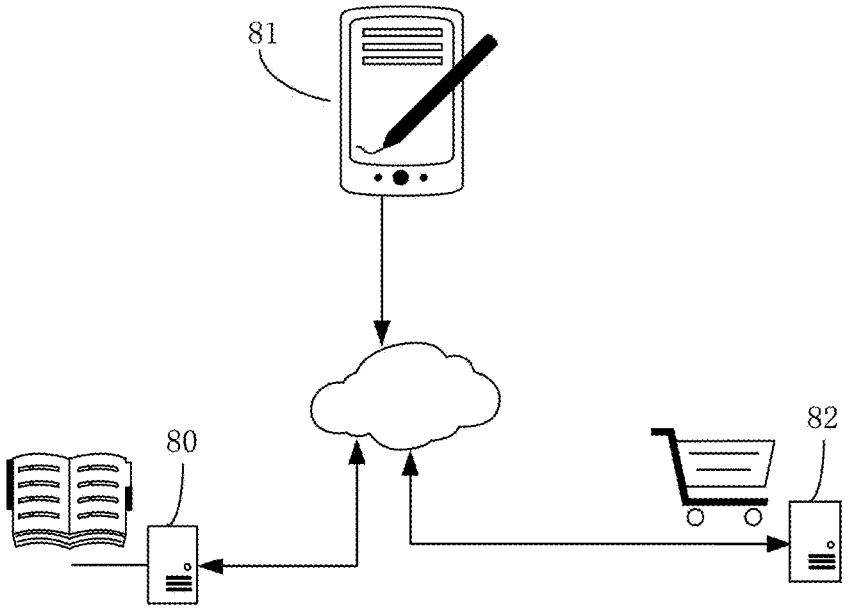
FIG. 1 is a schematic diagram of a network architecture of an e-commerce platform provided by one embodiment of the present application.

In the network architecture shown in FIG. 1, an e-commerce platform 82 is deployed on the Internet to provide corresponding services to its users. Similarly, a device 80 of a merchant user of the e-commerce platform 82 and a device 81 of a consumer user are also connected to the Internet to use the services provided by the e-commerce platform. For example, the e-commerce platform may provide live streaming services for merchant users of various online stores on the e-commerce platform by configuring a live streaming system. For the live streaming services, the merchant users are host users. The host users may start e-commerce live streaming rooms to implement live streaming activities, such as real-person live streaming activities or virtual live streaming activities based on virtual people or digital people, etc.; consumer users may also access the e-commerce live streaming rooms as audience users of the live streaming services, receive video streams and information streams of live streaming activities, and interact with the host users in a two-way manner to participate in the live streaming activities.

In one embodiment, the e-commerce platform 82 provides a supply-demand matching of products and/or services to the general public with the help of Internet infrastructures. On the e-commerce platform 82, products and/or services are provided as commodity information. To simplify the description, concepts of commodities, products, etc. are used in this application to refer to the products and/or services on the e-commerce platform 82, which may specifically be physical products, digital products, tickets, service subscriptions, other offline services, etc.

In reality, all entities may access the e-commerce platform 82 as users, and use various online services provided by the e-commerce platform 82, and achieve a purpose of participating in business activities achieved by the e-commerce platform 82. These entities may be natural persons, legal persons, or social organizations, etc. Corresponding to two types of entities, i.e., merchants and consumers in business activities, the e-commerce platform 82 has two types of users, i.e., merchant users and consumer users. All entities in a product distribution chain in business activities, including manufacturers, sellers, retailers, logistics providers, etc., may use online services on the e-commerce platform 82 as merchant users, while consumers in business activities, including real or potential consumers, may use online services on the e-commerce platform 82 as their corresponding consumer users. In actual business activities, the same entity may act as both a merchant user and a consumer user, and this should be understood flexibly.

The infrastructure used to deploy the e-commerce platform 82 mainly includes a backend architecture and a frontend equipment. The backend architecture runs various online services through a service cluster, including middleware or frontend services for the platform, services for consumers, services for merchants, etc., to enrich and improve its service functions; the frontend equipment mainly covers terminal devices used by users to access the e-commerce platform 82 as clients, including but not limited to various mobile terminals, personal computers, point-of-sale devices, etc. For example, merchant users may enter product information for their online stores through their terminal devices 80, or generate their product information using an interface opened by the e-commerce platform; consumer users may access webpages of the online stores implemented by the e-commerce platform 82 through their terminal devices 81, trigger a shopping process through shopping buttons provided on a webpage, and invoke various online services provided by the e-commerce platform 82 during the shopping process, so as to achieve the purpose of shopping orders.

In some embodiments, the e-commerce platform 82 may be implemented by a processing facility including a processor and a storage device, the processing facility stores a set of instructions, which when executed, cause the e-commerce platform 82 to perform e-commerce functions involved in the present application. The processing facility may be one of a server, a client, a network infrastructure, a mobile computing platform, a cloud computing platform, a fixed computing platform, or other computing platform, and provides electronic components, merchant equipment, payment gateways, application developers, marketing channels, transportation providers, customer equipment, point-of-sale equipment, etc. of the e-commerce platform 82.

The e-commerce platform 82 may be implemented as an online service such as a cloud computing service, software as a service (Saas), infrastructure as a service (IaaS), platform as a service (PaaS), desktop as a service (DaaS), hosted software as a service, mobile backend as a service (MBaaS), information technology management as a service (ITMaaS), etc. In some embodiments, the various functional components of the e-commerce platform 82 may be implemented to be suitable for operation on various platforms and operating systems. For example, for an online store, its administrator user enjoys the same or similar functions regardless of various embodiments such as IOS, Android, HomonyOS, or web pages.

The e-commerce platform 82 may realize a corresponding independent station for each merchant to run its corresponding online store, and provide the merchant with the corresponding business management engine instance for the merchant to establish, maintain and run one or more online stores in one or more independent stations. A business management engine instance may be used for a content management, a task automation and a data management of one or more online stores, and various specific business processes of the online stores may be configured through interfaces or built-in components to support the implementation of business activities. The independent station is the infrastructure of the e-commerce platform 82 with cross-border service functions. Merchants may maintain their online stores more centrally and autonomously based on the independent station. The independent station usually has a domain name and a storage space dedicated to the merchant, and different independent stations are relatively independent. The e-commerce platform 82 may provide standardized or personalized technical support for a large number of independent stations, so that merchant users may customize their own business management engine instance and use this business management engine instance to maintain one or more online stores they own.

The online store may implement a backend configuration and a maintenance by having the merchant user log in to its business management engine instance as an administrator. With the support of various online services provided by the infrastructure of the e-commerce platform 82, the merchant user may configure various functions in its online store as an administrator, view various data, etc. For example, the merchant user may manage various aspects of its online store, such as viewing the online store's recent activities, updating the online store's product catalog, managing orders, recent visit activities, total order activities, etc.; the merchant user may also view more detailed information about the business and visitors to the merchant's online store by obtaining reports or metrics, such as showing a sales summary of the merchant's overall business, specific sales and participation data of active sales marketing channels, etc.

The e-commerce platform 82 may provide communication facilities and associated merchant interfaces for providing electronic communications and marketing, such as utilizing electronic message aggregation facilities to collect and analyze communication interactions between merchants, consumers, merchant devices, customer devices, point-of-sale devices, etc., aggregate and analyze communications, such as for increasing a potential for providing product sales, etc. For example, a consumer may have a question related to a product, which may generate a dialogue between the consumer and the merchant (or agent on behalf of the merchant based on an automated processor), where the communication facility is responsible for interacting and providing the merchant with an analysis on how to increase a sale probability.

In some embodiments, an application suitable for installation in a terminal device may be provided to serve access needs of different users, so that various users may access the e-commerce platform 82 by running the application in the terminal device, such as a merchant backend module of the online store on the e-commerce platform 82, etc. In a process of implementing business activities through these functions, the e-commerce platform 82 may implement various functions related to supporting the implementation of business activities as middleware or online services and open corresponding interfaces, and then implant a toolkit corresponding to an interface access function into the application to implement a function expansion and a task implementation. A business management engine may include a series of basic functions, and expose these functions to online services and/or applications for invoking through APIs. The online services and applications use corresponding functions by remotely invoking corresponding APIs.

With the support of various components of the business management engine instance, the e-commerce platform 82 may provide online shopping functions, enabling merchants to establish connections with customers in a flexible and transparent manner. Consumer users may select items online, create product orders, provide a delivery address of goods in a product order, and complete a payment confirmation of the product order. Then, the merchant may review and complete or cancel the order. A review component carried by the business management engine instance may realize a compliance use of business processes to ensure that the order is suitable for fulfillment before actual fulfillment. Orders may sometimes be fraudulent and need to be verified (such as ID card checks). There is a payment method that requires merchants to wait to ensure that funds are received, which may play a role in preventing such risks, etc. Order risks may be generated by fraud detection tools submitted by third parties through order risk APIs, etc. Before fulfillment, merchants may need to obtain payment information or wait to receive payment information in order to mark the order as paid, so that the merchant may prepare to deliver the product. Such situations may be reviewed accordingly. The review process may be implemented by a fulfillment component. Merchants may use the fulfillment component to review, adjust work, and trigger related fulfillment services, such as: manual fulfillment services, which are used when merchants pick and pack products in boxes, purchase shipping labels and enter their tracking numbers, or simply mark items as fulfilled; custom fulfillment services, which may define email notifications; API fulfillment services, which may trigger third-party applications to create fulfillment records in third parties; legacy fulfillment services, which may trigger a custom API invoking from the business management engine to third parties; gift card fulfillment services. Generation of numbers and activate gift cards may be provided. Merchants may use an order printer application to print shipping orders. The fulfillment process may be executed when items are packed in boxes and ready for shipping, tracking, delivery, consumer receipt verification, etc.

The e-commerce platform 82 may also deploy a risk control system to perform a security detection on a network access behavior of merchant users and/or consumer users during e-commerce activities or live streaming activities, timely discover non-compliant operations and implement corresponding technical intervention measures to ensure a healthy operation of the e-commerce platform. A computer device of the merchant user, that is, the host user of the e-commerce live streaming, may run a computer program product implemented according to the method for preventing the false triggering of the live streaming risk control as a digital broadcast control system, so as to prevent an operation behavior implemented by the merchant user during the live streaming activity from being mistakenly identified as non-compliant operation by the risk control system, and reduce a frequency of the risk control system interfering with the live streaming activity.

Figure 2:
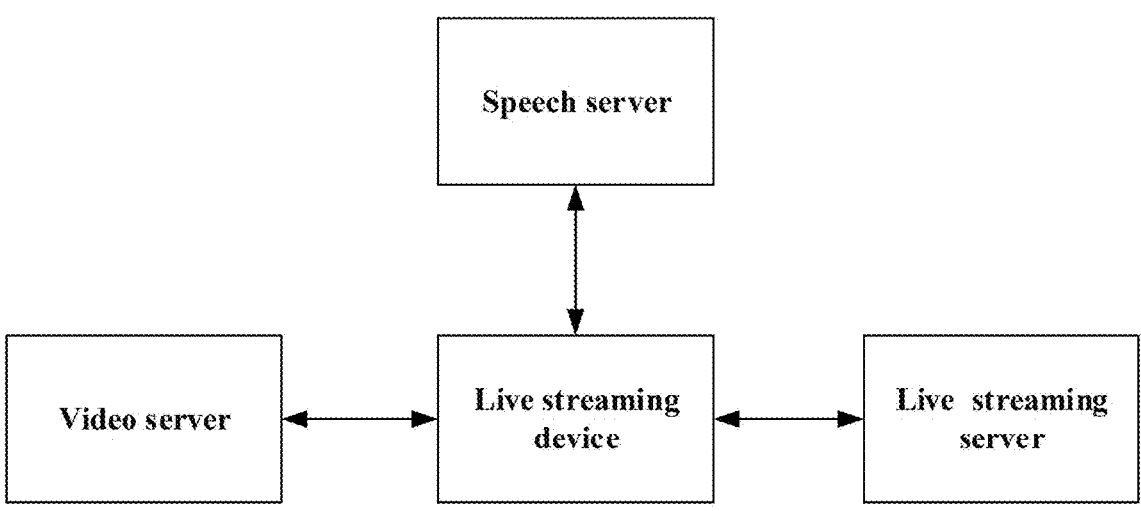
FIG. 2 is a schematic diagram of a network architecture for providing a support to a digital broadcast control system provided by one embodiment of the present application.

In order to support the merchant user, that is, the host user, to run the computer program product of the present application, a network architecture of the digital broadcast control system as shown in FIG. 2 may be provided, which includes a speech server, a video server, a live streaming server on the e-commerce platform 82 for supporting a network live streaming, and a terminal device used by the host user, that is, a live streaming device. The speech server may be used to provide relevant texts to the host user's live streaming device, such as speech texts, insertion texts, etc.; the video server may help the host user's live streaming device to generate a portrait oral video corresponding to the text; the live streaming server of the e-commerce platform may send a video pushed by the host user's terminal device, such as the portrait oral video, to the e-commerce live streaming room, so that audience users in the e-commerce live streaming room may receive and play the corresponding portrait oral video, so that the host user may achieve a purpose of implementing the live streaming activity through his live streaming device. When the host user broadcasts live through his e-commerce live streaming room, he may implement both a real-person live streaming activity and a virtual live streaming activity based on a virtual people, that is, a digital people. During the virtual live streaming activity, through a multi-party interaction with the speech server, the video server and the live streaming server, the portrait oral video corresponding to a specified speech and a specified portrait is pushed to the e-commerce live streaming room.

Please refer to FIG. 3. In some embodiments, the method for preventing the false triggering of the live streaming risk control of the present application may be implemented as a computer program product, which runs in the terminal device of the host user to build the digital broadcast control system to help the host user implement a playback control of the virtual live streaming activity in the e-commerce live streaming room on the e-commerce platform. The method includes following steps.

Step S5100, an e-commerce live streaming room on the e-commerce platform for executing the virtual live streaming activity is started in response to an instruction of starting a virtual live streaming;

When the computer program product of the present application is running on the terminal device of the host user, the host user may access the e-commerce live streaming room registered on the e-commerce platform through a preset control method to start the live streaming. For example, the host user may click a live streaming start button on a management page of an online store registered on the e-commerce platform to trigger the instruction of starting the virtual live streaming. After the computer program product of the present application is run, a background process responds to the instruction of starting the virtual live streaming, and may interact with the live streaming server of the e-commerce platform according to its default business logic to start the e-commerce live streaming room of the host user, so as to perform the virtual live streaming activity through the e-commerce live streaming room.

Step S5200, a speech list is obtained from a speech server through a speech generation service, where the speech list includes speech texts corresponding to different business links in a same live streaming business process;

In order to achieve efficient operation, the computer program product of the present application runs the speech generation service, and communicates with the speech server through the speech generation service. Therefore, before starting to push streams for the virtual live streaming activity, the speech generation service may be used to obtain the corresponding speech list for implementing the virtual live streaming activity from the speech server.

The speech server has an ability to generate texts corresponding to a speech required for the virtual live streaming activity for the host user, and may provide the corresponding texts for the speech generation service through a variety of different implementation methods, pre-store various texts in a corresponding database, and when the speech generation service needs to be invoked, determine texts that are matched from the database and return the texts to the speech generation service. For example:

In one embodiment, the speech server may maintain a database for a live streaming business process, speech texts corresponding to different business links in multiple live streaming business processes are stored in the database. The host user may obtain the speech list corresponding to a specified live streaming business process from the speech server through the speech generation service. The speech server only needs to invoke the speech texts corresponding to each business link in the corresponding live streaming business process from the database to construct the speech list and push it to the speech generation service. The live streaming business process includes multiple business links.

The speech corresponding to each business link realizes an output of an expected information type corresponding to each business link, realizes a dissemination of information in stages, and the information disseminated through each stage constitutes overall information disseminated by the entire live streaming business process, so as to achieve an expected dissemination purpose. A type of a dissemination role played by the business link in the live streaming business process may be flexibly customized. For example, a typical live streaming speech related to recommending products in online stores includes: an opening introduction link, a pain point explanation link, a product selling point link, an order promotion link, an attention attraction link and other different business links. Each business link may pursue its expected dissemination effect through corresponding speech, and the speech used in different business links is generally different. Multiple speech texts may be set for each business link. When constructing the speech list for a live streaming business process, the speech server may randomly select one speech text from the multiple speech texts corresponding to each business link in the live streaming business process and add it to the speech list.

In another embodiment, the speech server may also maintain an advertising speech database. After the host user's terminal device submits product information to be promoted to the speech server, the speech server matches one or more corresponding promotional speech texts from the advertising speech database according to the product information to form a speech list, and returns the speech list to the terminal device of the host user. This speech list related to the advertising may be started by the host user inputting a product to be advertised. After the host user determines the product to be advertised, the speech generation service or directly submits the product to be advertised to the speech server. The speech server invokes the product information of the product to be advertised from a product database of the e-commerce platform, including picture information and/or text information, and then obtains the corresponding speech text that matches the product information from the advertising speech database according to the product information to form the speech list.

Similarly, in another embodiment, the speech server may also maintain a database of questions and answers for customer services. When an audience user provides an input text related to a question in the e-commerce live streaming room, the speech server obtains one or more corresponding speech texts matching the input text as answers from the database of questions and answers for customer services based on the input text to form a speech list, and returns the speech list to the host user. Similarly, this speech list may be obtained by the speech generation service after the input text is obtained by detecting a chat record in the e-commerce live streaming room and performing an interaction with the speech server. It may also be obtained by the live streaming server interacting with the speech server to determine the input text corresponding to the question of the user, and then the live streaming server obtains it from the speech server and pushes it to the host user, so as to drive the generation of the corresponding portrait oral video.

In another embodiment, for various speech texts that the host user needs to obtain, the speech server may use a well-trained neural network model, such as various large language models, to generate a corresponding speech list based on basic material text and prompt text submitted by the host user to the speech server, and directly return it to the speech server. This method may not only provide the speech list required for the live streaming business process, but also provide the speech list corresponding to an advertisement and questions and answers of customer services. The speech list may have a single speech text or multiple speech texts, depending on a result generated by the neural network model and specific business needs.

In a flexible and adaptable embodiment based on the various embodiments above, the speech list obtained by the terminal device from the speech server through the speech generation service may not only include a pre-customized speech list corresponding to a same live streaming business process, which only includes the speech text corresponding to each business link in the live streaming business process, but also may be a speech list corresponding to the same live streaming business process, in which a speech text that plays an advertising role may be implanted, and the latter may be used as one business link in the live streaming business process, namely, an advertising insertion link, that is, the live streaming business process includes the advertising insertion link, and thus the speech list also includes the speech text corresponding to the advertising business link, which may facilitate a subsequent generation of a more natural and smooth advertising insertion effect based on the speech list.

In a further enriched embodiment, the speech server may respond to the speech generation service's request for the speech list, first determine the speech list corresponding to the live streaming business process specified by the request, and the product information of the product to be advertised specified by the request, and then use each speech text in the speech list as a reference text, generate a model prompt text by inserting the product information in a preset prompt text template, input the reference text and the model prompt text into a large language model, control the large language model to associate the reference text to generate the speech text of the product to be advertised, and determine a position of the speech text of the product to be advertised in the speech list of the live streaming business process, so that the speech list finally obtained also includes the speech text corresponding to the advertising insertion link, and between this speech text of the product to be advertised and the speech text of each business link of the original live streaming business process, with the help of the ability of the large language model to sort out contextual semantics, they may transition more smoothly in natural semantics, presenting the audience with a feeling of presenting advertising information in natural conversation, playing a role similar to soft advertising, and further optimizing the user experience of the audience.

Step S5300, the portrait oral video corresponding to each of the speech texts is generated based on a template video by invoking the video server, through the video generation service, the template video has a preset regulation time, and each image frame of the template video includes a facial image collected based on a same person;

In order to achieve efficient operation, the computer program product of the present application runs a video generation service, and communicates with the video server through the video generation service, so as to drive the video server to generate the corresponding portrait oral video according to the text directly or indirectly submitted by the side of the host user (i.e., the terminal device of the host user), such as the speech text, the insertion text, etc. After obtaining each speech text in the speech list, the digital broadcast control system of the host user's terminal device submits each speech text to the video server in the network architecture through the video generation service. The video server invokes the template video preset by the host user, and generates the portrait oral video corresponding to the speech text based on the template video.

Specifically, a voice action driven model may be deployed in the video server. For example, the voice action driven model first converts the text received by the video server, such as the speech text or the insertion text, into a voice sequence through an acoustic model and obtains audio data, and determines a corresponding audio duration randomly located and intercepted a video image frame sequence corresponding to the audio duration from the template video preset by the host user according to the audio duration; obtains a corrected image frame sequence by correcting a mouth shape of the face image in each image frame of the video image frame sequence using the voice sequence based on a temporal alignment relationship; and encoding the audio data and the corrected image frame sequence into the portrait oral video based on the temporal alignment relationship. After the video server generates the portrait oral video corresponding to each text, it may be pushed to the host user's terminal device, and the terminal device may download the corresponding portrait oral video to a local and establish an associated mapping with the corresponding speech text or insertion text for subsequent invoking.

The template video may be collected in advance by the host user and uploaded to the video server for storage. In the present application, the required duration sufficient to ensure a diversity of portrait movements in the template video is pre-set, and the host user collects a material video based on a reference duration determined by the required duration. After the host user completes the collection of the material video, if a total duration of the material video is still less than the required duration, the terminal device or the video server may extend the material video to a length that meets the required duration through data enhancement. After the total duration of the material video is greater than or equal to the required duration, the material video may be used as a template video.

In one embodiment, the host user may preset multiple template videos. Characters in different template videos may be a same staff member or different staff members. Different template videos may have different styles, such as different space environments, different clothing styles, different desktop layouts, etc. When the video server needs to generate a portrait oral video, it randomly invokes any one of the template videos to collect a video image frame sequence to generate a portrait oral video.

When the host user collects the material video, an image of an upper body of the same person is recorded by a real person. The person in front of the camera may speak or not, but may have a variety of expressions and actions, so as to enrich action features in the same material video and finally migrate it to the template video. According to this requirement, the image frames in the material video include the facial image of the person, so the template video also includes the facial image of the same person, which may be used as a basis for driving a lip shape by a voice.

Step S5400, the virtual live streaming activity is implemented by pushing the portrait oral video corresponding to each of the speech texts in the speech list to the e-commerce live streaming room through a virtual camera driving service, according to the live streaming business process In order to further reduce a probability of misjudgment of the risk control system, the computer program product corresponding to the digital broadcast control system of the present application may install a virtual camera driver service in the terminal device of the host user by itself. After completing the acquisition of the speech list and the portrait oral video corresponding to each speech text, the virtual camera driver service is invoked to push the portrait oral video corresponding to each speech text in the speech list to the e-commerce live streaming room one by one, thereby implementing the virtual live streaming activity. Since the various speech texts in the speech list are organized in order according to the various business links of the same live streaming business process, the portrait oral video corresponding to each speech text may be invoked according to a natural order of the various speech texts in the speech list to stream to the live streaming server of the e-commerce platform. After the live streaming server receives a video stream of the portrait oral video, it will push it to the terminal device of each audience user in the e-commerce live streaming room, so that each audience user may watch the portrait oral video and voice content of the corresponding speech text through a playback window of a corresponding page of the e-commerce live streaming room. Since the portrait oral video is voice-driven to correct the lip movements according to the corresponding speech text, in the eyes of the audience users, the voice and lip movements of the people in the portrait oral video are coordinated and corresponding when speaking, which is more natural.

It is not difficult to see that when the live streaming user starts the live streaming room to perform the virtual live streaming activity, this application first invokes the speech list from the speech server through the speech generation service to obtain the speech text corresponding to each business link of the same live streaming business process, and then uses the video generation service to drive the video server to instantly generate the portrait oral video corresponding to each speech text based on the template video that has the preset required duration. Finally, these portrait oral videos are pushed to the e-commerce live streaming room through the virtual camera driving service to implement the virtual live streaming activity.

Based on this, many advantages of the present application may be reflected, including: in terms of dynamic recognition mechanism, the template video that meets the required duration may enrich and generalize motion features of the facial images of the people in the portrait oral video corresponding to each speech text, thereby reducing the frequency of the risk control system discovering repeated motion features; in terms of static recognition mechanism, the virtual camera driving service avoids an inherent defect of the risk control system in mechanically judging the robot's proxy live streaming behavior through the data source.

It may be seen that through the coordination of the two aspects, this application may effectively avoid the virtual live streaming activity from being misidentified as robot live streaming behavior by the risk control system of the e-commerce platform, whether from the dynamic identification mechanism or the static identification mechanism, thereby reducing the frequency of the risk control system's mistakenly triggering interference behavior against the virtual live streaming activity of the e-commerce live streaming room, improving the stability and the security of the virtual live streaming activity, and avoiding unnecessary economic losses for the e-commerce stores to which the e-commerce live streaming room belongs. At the same time, it may also escort the application of virtualized person live streaming in the e-commerce field and remove the obstacles to the application of virtualized person live streaming in the e-commerce field.

Based on any embodiment of the method of the present application, please refer to FIG. 4, according to the live streaming business process, the portrait oral video corresponding to each speech text in the speech list is pushed to the e-commerce live streaming room to implement the virtual live streaming activity, including following steps.

Step S5410, an insertion text is determined correspondingly in response to a dynamic insertion instruction triggered in the e-commerce live streaming room.

At any time during the virtual live streaming activity, the dynamic insertion instruction may be triggered in the e-commerce live streaming room. The digital broadcast control system determines the insertion text in response to the dynamic insertion instruction. Of course, the insertion text is also one kind of speech text, so as to generate the portrait oral video corresponding to the insertion text for insertion, for example:

In one embodiment, the host user may trigger the dynamic insertion instruction through the digital broadcast control system in his terminal device. For example, the digital broadcast control system may provide a function button. After the host user touches the function button, he inputs the insertion text and submits it, which triggers the dynamic insertion instruction; or the host user may also directly send a chat message to the e-commerce live streaming room, which includes an input text that triggers the dynamic insertion instruction to trigger and determine the insertion text accordingly. Through these situations, it is convenient for the host user to insert advertisements or other similar content in the virtual live streaming activity.

In another embodiment, the audience user may also trigger the corresponding dynamic insertion instruction by sending a chat message in the e-commerce live streaming room. For example, the audience user asks a question about a certain product and sends a corresponding chat message. The chat message includes the input text corresponding to the question, and the digital broadcast control system may obtain a reply text matching the input text as the insertion text. It is not difficult to understand that this situation is convenient for audience users to ask questions about the products on sale in the e-commerce live streaming room, and then the digital broadcast control system automatically answers to realize the automatic customer service function.

Step S5420, a portrait oral video corresponding to the insertion text is generated based on the template video by invoking the video server through a video generation service.

Similar to step S5300, after the insertion text is determined, the digital broadcast control system submits the insertion text to the video server through its video generation service. After receiving the insertion text, the video server converts the insertion text into a speech sequence with the help of the acoustic model, determines the video image frame sequence corresponding to the speech sequence from the selected template video, and then invokes the speech action driven model to correct the mouth shape of the face image in each image frame in the video image frame sequence according to the speech sequence to obtain the corrected image frame sequence, and then uses the time alignment relationship to encode the speech sequence and the corrected image frame sequence into a portrait oral video and return it to the video generation service.

Step S5430, the portrait oral video corresponding to the insertion text is inserted into the portrait oral video being pushed to the e-commerce live streaming room.

After the digital broadcast control system obtains the portrait oral video corresponding to the insertion text through its video generation service, the digital broadcast control system may insert the portrait oral video into the ongoing virtual live streaming activity in the e-commerce live streaming room, so that the virtual live streaming activity may more naturally implant the portrait oral video corresponding to the insertion text in the process of playing the portrait oral video corresponding to each speech text in the speech list according to the live streaming business process.

Since the virtual live streaming activity is in accordance with the preset live streaming business process, that is, pushes each corresponding portrait oral video to the live streaming server in real time according to the order of each speech text in the speech list, considering a need to maintain a smoothness of the playback of the virtual live streaming activity, it is possible to first determine the portrait oral video being pushed to the e-commerce live streaming room, that is, the live streaming server, and insert the portrait oral video corresponding to the insertion text after the portrait oral video being pushed before pushing the portrait oral video corresponding to the insertion text. Specifically, it may be inserted immediately after the portrait oral video being pushed, or it may be inserted to a position after pushing one or two portrait oral videos, which may be determined in combination with a response time of the dynamic insert instruction. For example, in one embodiment, when the role of the dynamic insert instruction is to answer a question asked by the audience user through the chat message, it may be inserted to a position immediately after the portrait oral video being pushed; in another embodiment, when the role of the dynamic insert instruction is to insert an advertisement, it may be inserted to a position delayed by multiple portrait oral videos relative to the portrait oral video being pushed.

According to the above embodiments, it may be known that during the virtual live streaming activity, it is allowed to trigger the dynamic insertion instruction in a variety of ways to determine the corresponding insertion text, and generate the corresponding portrait oral video based on this and insert it into the pre-determined speech list for playback, which may be used to realize advertising implantation and may also be used to automatically provide automatic question-and-answer services to audience users. The whole process is relatively smooth, making the interaction between people presented in the virtual live streaming activity in the e-commerce live streaming room more realistic and natural, and may significantly improve the user experience of audience users participating in the e-commerce live streaming room. In addition, because the diversity of portrait oral videos in the speech list may be enriched through dynamic insertion instructions, the risk of virtual live streaming activity being identified as mechanized and repetitive robot live streaming behaviors may also be further reduced, that is, the false triggering rate of the risk control system of the e-commerce platform may be reduced, ensuring a stable progress of the virtual live streaming activity.

Based on any embodiment of the method of the present application, please refer to FIG. 5, determining the insertion text correspondingly in response to the dynamic insertion instruction triggered in the e-commerce live streaming room includes following steps:

Step S5411, user input information in the e-commerce live streaming room is detected, and an intent recognition is performed on the user input information to determine whether the user input information carries an insertion intent.

When it is necessary to identify the dynamic insertion instruction through the chat message in the e-commerce live streaming room, the digital broadcast control system of the present application may be responsible for detecting each chat message in a public screen message flow in the e-commerce live streaming room, and obtaining the chat message of each user, including the host user and the audience user, that is, the user input information submitted by the corresponding user. Then, a pre-trained intent recognition model is used to perform the intent recognition on the user input information to determine whether the user input information carries the insertion intent. When it is determined that it carries the insertion intent, the corresponding dynamic insertion instruction may be triggered.

Step S5412, when the user input information carries the insertion intent, the dynamic insertion instruction corresponding to the insertion intent is triggered, and an insertion type and an input text corresponding to the insertion intent are determined according to the user input information.

When the user input information is recognized to carry the insertion intent and the corresponding dynamic insertion instruction is triggered, the digital broadcast control system may further determine the corresponding insertion type and an input text according to the user input information and the insertion intent included therein.

For example, the user input information submitted by the host user is "Please help me generate an advertisement for XX model of sports shoes". Based on the user input information, the intent recognition model may determine that there is an insertion intent for an advertisement. After removing invalid characters and emoticons in the user input information, the user's input text for effective expression may be obtained.

For example, the user input information submitted by the audience user is "Host, what material are your sneakers made of?" The intent recognition model may determine that there is an insertion intent corresponding to answering the question based on the user input. Similarly, after removing invalid characters and emoticons in the user input information, the user's input text for effective expression may be obtained.

Step S5413, an inference text corresponding to the input text from a database corresponding to the insertion type is determined as an insertion text.

After determining the insertion type, the digital broadcast control system knows an interface that needs to be invoked. For example, for inserting advertisements, the interface provided by an advertising system may be invoked; for answering questions, the interface provided by a customer service system may be invoked. By invoking the corresponding interface, the insertion text corresponding to the input text may be further obtained.

For example, in the embodiment corresponding to the inserting advertisement, the digital broadcast control system extracts product keywords from the user's input text, such as "XX model sports shoes", and then submits it to the interface provided by the advertising system. The interface provided by the advertising system matches the target product corresponding to the product keyword from the database of the online store corresponding to the host user on the e-commerce platform, that is, a product database, based on the product keywords, and obtains the product information of a target product, including but not limited to any one or more of a product image, a product title, a product detailed text, product attribute data, etc., according to a preset business logic. Then, the product information is input into a preset advertising copy generation model, and the inference text of a pure text nature is expanded to generate a corresponding advertising copy, which is essentially to generate the corresponding advertising copy and use the advertising copy as the insertion text.

For another example, in the embodiment corresponding to answering questions, the digital broadcast control system may invoke the interface provided by the customer service system during the live streaming and directly submit the user input text to it. The interface uses a semantic vector of the user input text to match a basic question with similar semantics from the database of the customer service system, i.e., the database of questions and answers, and invokes a reply text corresponding to the basic question from the database of questions and answers as the inference text of the input text. The digital broadcast control system may then use the inference text as the insertion text.

The above embodiments show that the digital broadcast control system of the present application has a highly intelligent feature, and may use the user input information in the e-commerce live streaming room to identify the intent, determine the corresponding insertion intent and its input text, and generate a reasoning text corresponding to the input text by invoking the interface corresponding to the insertion intent, and use the reasoning text as the insertion text. The whole process is implemented automatically, eliminating the need for users to perform complex operations to automatically generate the corresponding portrait oral video for the user input information. By playing the portrait oral video in the virtual live streaming activity, the response to the user input information is completed, creating the effect that the people in the live streaming accept tasks assigned by the host user and give a speech, or creating the effect that the people in the live streaming respond to the needs of the audience users, which may significantly improve the user experience. In addition, since the insertion text is dynamically generated based on the user input information, the content of the insertion text generated each time is generally different, and the portrait oral video generated in the end is also different, which further reduces the probability of false triggering of the risk control system of the e-commerce platform.

On the basis of any embodiment of the method of the present application, inserting the portrait oral video corresponding to the insertion text after the portrait oral video being pushed to the e-commerce live streaming room includes following steps:

Step S5431, according to an order of business links in the live streaming business process, the portrait oral video corresponding to each speech text in the speech list is orderly transferred into a cache queue, and the portrait oral video orderly dequeued from the cache queue is pushed to the live streaming server.

In order to improve an operating storage efficiency of the terminal device and ensure the smoothness of the virtual live streaming activity at a data level, in this embodiment, the digital broadcast control system of the present application may be further combined with a cache technology for a technical optimization. Accordingly, the digital broadcast control system may load the portrait oral video of the speech text corresponding to each business link in the speech list of the live streaming business process into the cache queue according to the order of each business link in the preset live streaming business process. Then, combined with a queue scheduling principle, according to the order of each business link, control each portrait oral video to be dequeued from the cache queue in sequence according to the order of its corresponding business link. When one portrait oral video is dequeued from the cache queue for consumption, a consumption thread is responsible for encoding and pushing the portrait oral video to the live streaming server. After the live streaming server receives the corresponding video stream of the portrait oral video, it decodes and re-encodes it and pushes it to the terminal device of each audience user. The terminal device of each audience user decodes and plays the corresponding video stream, and the corresponding portrait oral video may be watched.

Step S5432, a head position of the portrait oral video being dequeued and pushed in the cache queue is detected and determined, and the portrait oral video corresponding to the insertion text is inserted into a next position of the head position.

In order to insert the portrait oral video corresponding to the insertion text into the existing live streaming business process, combined with the caching technology, the digital broadcast control system may first determine the portrait oral video that is being dequeued in the cache queue to achieve pushing the portrait oral video, determine the position of the portrait oral video as the head position of the cache queue, and then insert the portrait oral video corresponding to the insertion text into the next position of the head position of the cache queue, that is, the portrait oral video corresponding to the insertion text is dequeued immediately after the portrait oral video that is being dequeued. When the portrait oral video that is being dequeued has been dequeued and pushed, the portrait oral video corresponding to the insertion text may be dequeued immediately, thereby ensuring the immediacy of the playback of the portrait oral video corresponding to the insertion text.

According to the above embodiments, it may be understood that a playback order relationship between the portrait oral video corresponding to the insertion text and the portrait oral video in the existing live streaming business process is processed in combination with the caching technology, so that the playback of the portrait oral video corresponding to the insertion text also becomes one business link in the live streaming business process, and is naturally played in the live streaming business process. Since the caching technology is enabled, the transition of this process is natural, the transmission is stable and smooth, the robustness of the digital broadcast control system is better, and the portrait oral video corresponding to the insertion text is placed in the next position of the head position to ensure the immediacy of its playback. Its efficiency advantage is obvious when responding to the user input information.

Based on any embodiment of the method of the present application, please refer to FIG. 6, before obtaining the speech list from the speech server through the speech generation service, the following steps are included:

Step S4100, a material video having a duration of at least half of the required duration is obtained, where the material video includes facial images collected based on a same person.

As disclosed above, the required duration in this application is preset based on sufficient to ensure the diversity of portrait movements in the template video to effectively reduce the false triggering rate of the risk control system of the e-commerce platform. In this case, in theory, when the template video needs to be generated, it is only necessary to record the template video of a specific person according to this required duration, but a time cost of recording a video in this way is relatively high. In this case, when making the template video, a recording duration may be set, and the recording duration may be set according to any value greater than or equal to half of the required duration, so as to save the cost of the recording time. Under this condition, the digital broadcast control system may activate a recording program to record the material video of a person. During recording, a camera may be aimed at the upper body of the person to ensure that the facial image of the person is included in each image frame of the material video. It should be pointed out that the material video does not need to record audio data.

Step S4200, a reverse video is generated by arranging image frames of the material video in a reverse order.

After the digital broadcast control system obtains the material video, the digital broadcast control system arranges the image frames of the material video in the reverse order and obtains the reverse video of the material video. When the reverse video is played after processed in this way, a visual effect actually enriches the diversity of the people's movements in the video, especially facial movements. Therefore, the reverse video is essentially a product of a data enhancement of the material video in a better way, which may save users the trouble of recording a long material video.

Step S4300, the template video for producing the portrait oral video is obtained by splicing the material video and the corresponding reverse video.

After determining the material video and the reverse video, the reverse video may be spliced after the material video to achieve the splicing of the material video and its reverse video, and obtain a spliced video. The spliced video may be used directly as the template video. For the convenience of subsequent invokes, the template video may also be associated with a corresponding identifier of the corresponding live streaming business process for storage. Later, the corresponding template video may be invoked according to the identifier corresponding to the live streaming business process for making the portrait oral video. It is not difficult to understand that a total duration of the template video obtained in this way must be greater than or equal to the preset required duration. Since a first image frame of the reverse video is also a last frame of the material video, and the reverse video is spliced after the material video, the people's movements in the entire template video is relatively smooth, and the people's movements in the video image frame sequence intercepted in a middle of the template video must also be smooth. Similarly, since the last image frame of the reverse video is also the first frame of the material video, when it is necessary to intercept the video image frame sequence at the end of the template video and it is necessary to exceed the total duration of the template video, it may also be looped to the first frame of the template video to continue intercepting, so that the people's movements in the video image frame sequence obtained is also necessarily smooth.

In some embodiments, if the total duration of the template video is much longer than the preset required duration, the template video may be cropped for a purpose of controlling a storage space. In this case, a duration to be cropped may be divided by two to obtain a duration to be deleted, and the image frames corresponding to the duration to be deleted may be deleted from a beginning and a end of the template video. This ensures that the image frames of the beginning and the end of the template video corresponding to each other, and ensures that when the video image frame sequence is extracted loopy based on the template video, the people's movements are still smooth.

It may be seen from the above embodiments that although the digital broadcast control system sets a required duration, the data enhancement method adopted in this embodiment may effectively reduce the time of recording the material video. The material video is expanded by generating the reverse video based on the material video to obtain the template video. While reducing the time cost of recording the material video, it may also ensure that when the video image frame sequence corresponding to the speech text/insertion text is subsequently obtained based on the template video, the people's movements in the sequence are still relatively smooth and natural, which will not make the audience feel abrupt and will not easily trigger the alarm of the risk control system of the e-commerce platform by mistake, thereby improving the operation stability of virtual live streaming activity.

Based on any one embodiment of the method of the present application, please refer to FIG. 7, before obtaining the material video having the duration of at least half of the required duration, the method includes the following steps:

Step S3100, an interference rate that the virtual live streaming activity in the e-commerce live streaming room interfered by the risk control system of the e-commerce platform is calculated, the virtual live streaming activity is executed in response to the instruction of starting the virtual live streaming.

During a long-term implementation of the virtual live streaming activity by the host user through the digital broadcast control system of the present application, the digital broadcast control system may be responsible for recording each time the virtual live streaming activity triggers the intervention of the risk control system of the e-commerce platform, and based on this, a total number of implementations of the virtual live streaming activity and the number of interferences corresponding to the corresponding interference events that trigger the intervention of the risk control system may be obtained. By dividing the number of interferences by the total number of implementations, the interference rate corresponding to interferences by the risk control system may be obtained.

The interferences by the risk control system include but are not limited to temporarily suspending an ongoing virtual live streaming activity, banning the ongoing virtual live streaming activity, deducting points of the host user of the ongoing virtual live streaming activity, sending an alarm notification to the host user, and any other punitive or warning behaviors. Each time such interference is implemented, it will be deemed to trigger an interference event, and the digital broadcast control system records it accordingly for subsequent statistical implementation.

The digital broadcast control system determines the interference rate when the host user starts the virtual live streaming activity and triggers the corresponding instruction of starting the virtual live streaming, so as to ensure a smooth progress of the current virtual live streaming activity in a timely manner.

Step S3200, whether the interference rate is not less than a preset threshold is determined, and an instruction for expanding the material video is triggered when the interference rate is not less than the preset threshold, a fixed duration is superimposed on the required duration to achieve an update, and using the updated required duration as the recording duration.

The digital broadcast control system also presets a threshold value, which may be an empirical threshold value or an experimental threshold value. The threshold value is used to compared with the interference rate. When the interference rate is not less than the threshold value, the instruction for expanding the material video may be triggered to guide the host user to re-record a longer material video to generate a new template video. When the interference rate is less than the threshold value, no subsequent processing is required.

The recommended threshold value may be arbitrarily set between 20% and 30%. That is, if the implementation of virtual live streaming activity relying on historical template videos results in 20% to 30% of the activities being interfered with by the risk control system, the user may be guided to re-make the template video.

The reason for the increase in the interference rate of the risk control system may be that the diversity of movement features of the people in the template video is not enough to circumvent conditional parameters of a dynamic detection mechanism of the risk control system. On the other hand, it may be that the risk control system has increased the requirements of these conditional parameters. In any case, the diversity of the movement features of the people in the video may be ensured by extending the total duration of the template video. Accordingly, while triggering the instruction for expanding the material video, this embodiment also updates the previously used required duration. Specifically, a preset fixed duration may be used, and the previously used required duration plus the fixed duration is added as the new required duration, and the material video is recorded with the new required duration. This fixed duration may be a preset value, such as 5 minutes, 10 minutes, etc.

Step S3300, in response to the instruction for expanding the material video, a video recording program is started to record a material video using the updated required duration for making the template video.

After triggering the instruction for expanding the material video, in response to the instruction, the digital broadcast control system starts the video recording program and uses the updated required duration to produce a new template video. Specifically, the new template video may be produced according to the process from step S3100 to step S3300 in the previous embodiment.

In this embodiment, the digital broadcast control system uses the statistically obtained interference rate corresponding to the risk control system's interference with the virtual live streaming activity to make an intelligent decision on whether to re-produce the template video. When it is found that the interference rate is high, the required duration is appropriately extended by superimposing the fixed duration in a timely manner, and the user is guided throughout the process to re-produce the template video with a duration greater than or equal to the required duration, ensuring that a diversity degree of the movement features of the people in the template video used may reduce the interference rate of the risk control system in the virtual live streaming activity, effectively reduce the false triggering rate of the risk control system, and improve the robustness of the virtual live streaming activity.

Based on any embodiment of the method of the present application, please refer to FIG. 8, invoking the video server to generate the portrait oral video corresponding to each speech text based on the template video or invoking the video server to generate the portrait oral video corresponding to the insertion text based on the template video, includes following steps:

Step S6100, the video server obtains the speech text/insertion text of the portrait oral video to be generated, invokes the acoustic model to generate audio data of the speech text/insertion text, and determines a speech duration of the audio data.

Since the insertion text is also a kind of speech text, the two are similar. Therefore, when describing the process of the video server generating the portrait oral video, this embodiment mainly describes the speech text. Those skilled in the art should know that it is also applicable to the insertion text.

After the video server obtains the speech text or insertion text submitted by the digital broadcast control system for generating the human voice broadcast video, a preset acoustic model is invoked to convert the speech text or insertion text into audio data, and the audio data may be represented as a speech sequence to facilitate intermediate invokes. The acoustic model may be any mature known model, which may be directly invoked and implemented by those skilled in the art from the prior art.

When the acoustic model generates the corresponding audio data through its text-to-speech reasoning ability, the corresponding duration of the audio data is determined and may be used as the speech duration.

Step S6200, the video server extracts a video image frame sequence corresponding to the speech duration from the template video.

The video server then extracts a segment of image frames corresponding to the speech duration from the template video having a duration greater than or equal to the required duration, determines the segment of image frames as the video image frame sequence corresponding to the speech duration, thereby ensuring that the video image frame sequence maintains a temporal alignment with a voice sequence of the audio data.

When the video server extracts the video image frame sequence from the template video, the video server may sequentially extract image frames at different positions from the same template video to form corresponding video image frame sequences when processing different speech texts multiple times, or it may be by randomly locating the corresponding video image frame sequence from the template video for the speech text processed each time.

Step S6300, the video server invokes a voice action driving model to correct mouth shape movements of facial images in the video image frame sequence according to the audio data generated corresponding to the speech text/insertion text, and obtains a corrected image frame sequence.

After the video server obtains the voice sequence corresponding to the speech duration, namely the audio data and the video image frame sequence, the video server may invoke its preset voice action driven model. The model may be any mature model and may be flexibly selected by the skilled in the art. Using this model, according to the voice data in the voice sequence, the mouth shape of the facial image of each image frame in the video image frame sequence is corrected, thereby realizing the correction of movements of the mouth shapes of the facial images in the entire video image frame sequence, thereby obtaining the corrected image frame sequence.

Step S6400, after the video server performs a time alignment on the audio data and the corrected image frame sequence, the video server generates the portrait oral video corresponding to the speech text/insertion text.

After the video server obtains the corrected image frame sequence, the video server encodes the corrected image frame sequence and the voice sequence representing the audio data according to a time alignment relationship, and may generate the portrait oral video corresponding to the speech text or the insertion text. The video server pushes the portrait oral video to the digital broadcast control system in the terminal device of the host user, which may be used to implement the virtual live streaming activity.

In this embodiment, the video server is responsible for centrally processing the generation of portrait oral videos corresponding to various speech texts, and its business logic is centralized and reusable, with a high computing efficiency. Since the video server may use the acoustic model and speech action correction model corresponding to text-to-speech to extract materials from the template video to generate portrait oral videos corresponding to speech texts, the generated portrait oral videos are of high quality. When the portrait oral videos are used for the virtual live streaming activity, it helps to reduce the false triggering rate of the risk control system of the e-commerce platform through the diversity of human action features in the portrait oral videos.

Figure 9:
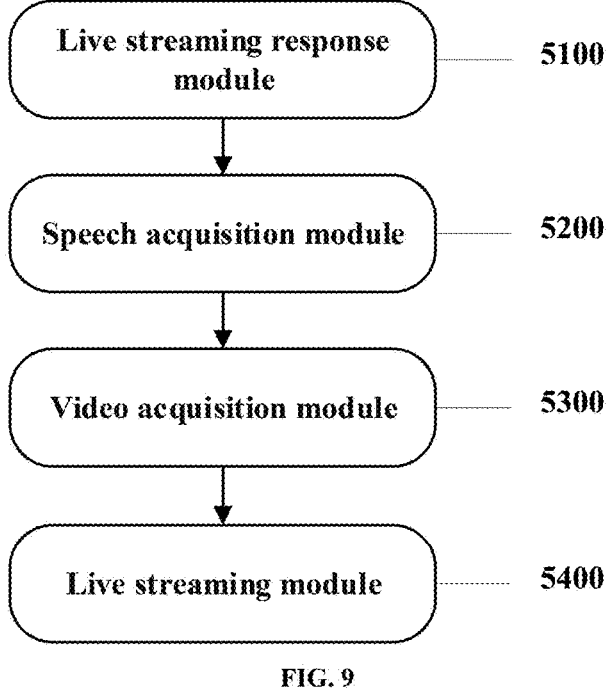
FIG. 9 is a schematic diagram of a structure of an apparatus for preventing the false triggering of the live streaming risk control provided by one embodiment of the present application.

Please refer to FIG. 9. Another embodiment of the present application also provides an apparatus for preventing a false triggering of the live streaming risk control, which includes a live streaming response module 5100, a speech acquisition module 5200, a video acquisition module 5300, and a live streaming module 5400, where the live streaming response module 5100 is configured to respond to the instruction of starting the virtual live streaming and start the e-commerce live streaming room on the e-commerce platform for executing the virtual live streaming activity; the speech acquisition module 5200 is configured to obtain the speech list from the speech server through the speech generation service, and the speech list includes speech texts corresponding to different business links in the same live streaming business process; the video acquisition module 5300 is configured to invoke the video server through the video generation service to generate the portrait oral video corresponding to each speech text based on the template video, and the template video has a preset required duration, and each image frame thereof includes the facial image collected based on the same person; the live streaming module 5400 is configured to push the portrait oral video corresponding to each speech text in the speech list to the e-commerce live streaming room according to the live streaming business process through the virtual camera driving service to implement the virtual live streaming activity.

Based on any one embodiment of the apparatus of the present application, the live streaming module 5400 includes: an insertion response module, which is configured to respond to the dynamic insertion instruction triggered in the e-commerce live streaming room and determine the corresponding insertion text; an insertion generation module, which is configured to invoke the video server through the video generation service to generate the portrait oral video corresponding to the insertion text based on the template video; a video insertion module, which is configured to insert the portrait oral video corresponding to the insertion text after the portrait oral video being pushed to the e-commerce live streaming room.

Based on any one embodiment of the apparatus of the present application, the insertion response module includes: an input detection module, which is configured to detect user input information in the e-commerce live streaming room, and perform the intent recognition on the user input information to determine whether the user input information carries the insertion intent; an information extraction module, which is configured to trigger the dynamic insertion instruction corresponding to the insertion intent when the user input information carries the insertion intent, and determine the insertion type and an input text corresponding to the insertion intent according to the user input information; a text determination module, which is configured to determine the inference text corresponding to the input text from the database corresponding to the insertion type as the insertion text.

Based on any embodiment of the apparatus of the present application, the video insertion module includes: a cache scheduling module, which is configured to orderly invoke the portrait oral video corresponding to each speech text in the speech list into the cache queue according to the order of the business links in the live streaming business process, and push the portrait oral video that is orderly dequeued from the cache queue to the live streaming server; a positioning insertion module, which is configured to detect and determine the head position of the portrait oral video that is being dequeued from the cache queue, and insert the portrait oral video corresponding to the insertion text into the next position of the head position.

On the basis of any embodiment of the apparatus of the present application, prior to the operation of the speech acquisition module 5200, the apparatus for preventing the false triggering of the live streaming risk control includes: a material acquisition module, configured to acquire the material video having the duration of at least half of the required duration, wherein the material video includes the facial images collected based on the same person; a reverse playback expansion module, configured to arrange the image frames in the material video in the reverse order to form the reverse video; a template production module, configured to splice the material video and the corresponding reverse video into the template video for producing the portrait oral video.

On the basis of any embodiment of the apparatus of the present application, prior to the operation of the material acquisition module, the apparatus for preventing the false triggering of the live streaming risk control includes: an interference statistics module, which is configured to count the interference rate corresponding to the interference of the risk control system of the e-commerce platform when the virtual live streaming activity is executed in response to the instruction of starting the virtual live streaming in the e-commerce live streaming room; a duration update module, which is configured to determine whether the interference rate is not less than the preset threshold, and when the interference rate is not less than the preset threshold, trigger the instruction for expanding the material video to update the required duration by superimposing the fixed duration, and use the updated required duration as the recording duration; a video re-recording module, which is configured to respond to the instruction for expanding the material video, start the video recording program, and record the material video for making the template video using the updated required duration.

Based on any embodiment of the apparatus of the present application, the video acquisition module 5300/the interstitial generation module includes: a generation preparation module, which is configured for the video server to obtain the speech text/insertion text to be generated for the portrait oral video, invoke the acoustic model to generate audio data of the speech text/insertion text, and determine the corresponding speech duration of the audio data; a template capture module, which is configured for the video server to extract the video image frame sequence corresponding to the speech duration from the template video; a mouth shape correction module, which is configured for the video server to invoke the voice action drive model, and correct the mouth shape movements of the facial images in the video image frame sequence according to the audio data generated corresponding to the speech text/insertion text to obtain the corrected image frame sequence; a video generation module, which is configured for the video server to generate the portrait oral video corresponding to the speech text/insertion text after performing the time alignment on the audio data and the corrected image frame sequence.

Figure 10:
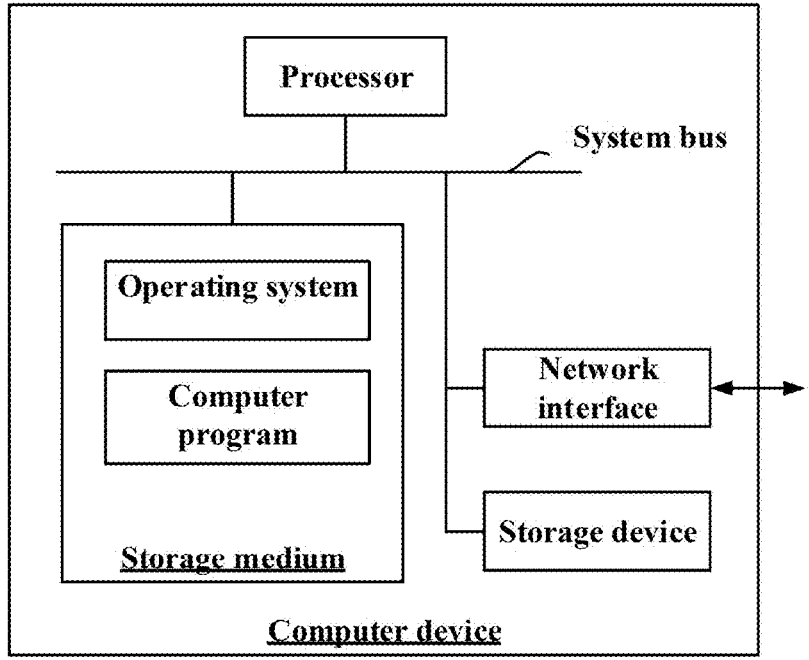
FIG. 10 is a schematic diagram of a structure of a computer device provided by one embodiment of the present application.

On the basis of any embodiment of the present application, please refer to FIG. 10. Another embodiment of the present application further provides a computer device, as shown in FIG. 10, which is a schematic diagram of an internal structure of the computer device. The computer device includes a processor, a computer-readable storage medium, a storage device, and a network interface connected via a system bus. Among them, the computer-readable storage medium of the computer device stores an operating system, a database, and a computer program encapsulated with computer-readable instructions. The database may store a control information sequence. When the computer-readable instructions are executed by the processor, the processor may implement the method for preventing the false triggering of the live streaming risk control. The processor of the computer device is used to provide computing and control capabilities to support the operation of the entire computer device. The storage device of the computer device may store computer-readable instructions. When the computer-readable instructions are executed by the processor, the processor may execute the method for preventing the false triggering of the live streaming risk control of the present application. The network interface of the computer device is used to connect and communicate with a terminal. It may be understood by those skilled in the art that the structure shown in FIG. 10 is only a block diagram of a partial structure related to the scheme of the present application, and does not constitute a limitation on the computer device to which the scheme of the present application is applied. The specific computer device may include more or fewer components than those shown in the figure, or combine certain components, or have different component arrangements.

In this embodiment, the processor is used to execute specific functions of each module and its submodule in FIG. 9, and the storage device stores program codes and various data required to execute the above modules or submodules. The network interface is used to transmit data between user terminals or servers. The storage device in this embodiment stores the program codes and data required to execute all modules/submodules in the apparatus for preventing the false triggering of the live streaming risk control of this application, and the server may invoke the program codes and data of the server to execute the functions of all submodules.

The present application also provides a storage medium storing computer-readable instructions. When the computer-readable instructions are executed by one or more processors, the one or more processors execute the steps of the method for preventing the false triggering of the live streaming risk control described in any embodiment of the present application.

The present application also provides a computer program product, including a computer program/instruction, which, when executed by one or more processors, implements the steps of the method for preventing the false triggering of the live streaming risk control described in any embodiment of the present application.

Those skilled in the art may understand that all or part of the processes in the above-mentioned embodiments of the present application may be implemented by instructing relevant hardware through a computer program, and the computer program may be stored in a computer-readable storage medium. When the computer program is executed, it may include the processes of the embodiments of the above-mentioned methods. Among them, the aforementioned storage medium may be a computer-readable storage medium such as a disk, an optical disk, a read-only memory (ROM), or a random access memory (RAM).

The above description is only a partial implementation method of the present application. It should be pointed out that for ordinary skilled in the art, several improvements and modifications may be made without departing from the principles of the present application. These improvements and modifications should also be regarded as a protecting scope of the present application.

To sum up, the present application enables the virtual live streaming activity to effectively avoid being misidentified as the robot live streaming by the risk control system of the e-commerce platform, whether from the dynamic identification mechanism or the static identification mechanism, thereby reducing the frequency of the risk control system's mistakenly triggering interference with the virtual live streaming activity of the e-commerce live streaming room, improving the stability and security of the virtual live streaming activity, and avoiding unnecessary economic losses for the e-commerce stores to which the e-commerce live streaming room belongs. At the same time, it may also safeguard the application of the virtualized person live streaming in the e-commerce field and remove obstacles to the application of the virtualized person live streaming in the e-commerce field.

What is claimed is:

1. A method for preventing a false triggering of a live streaming risk control, comprising:

responding to an instruction of starting a virtual live streaming, starting an e-commerce live streaming room on an e-commerce platform for executing a virtual live streaming activity;

obtaining a speech list from a speech server through a speech generation service, the speech list comprising speech texts corresponding to business links of a same live streaming business process;

generating a portrait oral video corresponding to each of the speech texts based on a template video by invoking a video server through a video generation service, the template video having a preset required duration, and each image frame of the template video comprising a facial image collected based on a same person; and implementing the virtual live streaming activity by pushing the portrait oral video corresponding to each of the speech texts in the speech list to the e-commerce live streaming room through a virtual camera driving service, according to the live streaming business process.

2. The method for preventing the false triggering of the live streaming risk control according to claim 1, wherein implementing the virtual live streaming activity by pushing the portrait oral video corresponding to each of the speech texts in the speech list to the e-commerce live streaming room through the virtual camera driving service, according to the live streaming business process, comprises:

responding to a dynamic insertion instruction triggered in the e-commerce live streaming room, determining an insertion text;

generating a portrait oral video corresponding to the insertion text based on the template video by invoking the video server through the video generation service;

inserting the portrait oral video corresponding to the insertion text after the portrait oral video being pushed to the e-commerce live streaming room.

3. The method for preventing the false triggering of the live streaming risk control according to claim 2, wherein responding to the dynamic insertion instruction triggered in the e-commerce live streaming room, determining the insertion text, comprises:

detecting user input information in the e-commerce live streaming room, and performing an intent recognition on the user input information to determine whether the user input information carries an insertion intent;

triggering the dynamic insertion instruction corresponding to the insertion intent, in response that the user input information carries the insertion intent, and determining an insertion type and an input text corresponding to the insertion intent according to the user input information; and determining an inference text corresponding to the input text from a database corresponding to the insertion type as the insertion text.

4. The method for preventing the false triggering of the live streaming risk control according to claim 2, wherein inserting the portrait oral video corresponding to the insertion text after the portrait oral video being pushed to the e-commerce live streaming room, comprises:

orderly transferring portrait oral videos corresponding to the speech texts in the speech list into a cache queue, according to an order of the business links in the live streaming business process, and pushing the portrait oral videos orderly dequeued from the cache queue to a live streaming server; and detecting a head position of the portrait oral video being dequeued and pushed in the cache queue, and inserting the portrait oral video corresponding to the insertion text into a next position of the head position.

5. The method for preventing the false triggering of the live streaming risk control according to claim 1, wherein before obtaining the speech list from the speech server through the speech generation service, the method further comprises:

acquiring a material video with a duration of at least half of the required duration, wherein the material video comprises facial images collected based on the same person;

generating a corresponding reverse video by arranging image frames in the material video in a reverse order; and splicing the material video and the corresponding reversed video into the template video for producing the portrait oral video.

6. The method for preventing the false triggering of the live streaming risk control according to claim 5, wherein before acquiring the material video with the duration of at least half of the required duration, the method further comprises:

calculating an interference rate that the virtual live streaming activity in the e-commerce live streaming room interfered by the risk control system of the e-commerce platform;

determining whether the interference rate is not less than a preset threshold value, and triggering an instruction for expanding the material video in response that the interference rate is not less than the preset threshold, updating the required duration by superimposing a fixed duration on the required duration, and using the updated required duration as a recording duration; and responding to the instruction for expanding the material video, starting a video recording program and recording the material video using the updated required duration for making the template video.

7. The method for preventing the false triggering of the live streaming risk control according to claim 6, wherein invoking the video server to generate the portrait oral video corresponding to each speech text of the speech texts based on the template video; or/invoking the video server to generate the portrait oral video corresponding to the insertion text based on the template video, comprises:

obtaining, by the video server, the speech text/insertion text of a portrait oral video to be generated; invoking, by the video server, an acoustic model to generate audio data of the speech text/insertion text; and determining, by the video server, a corresponding speech duration of the audio data;

extracting, by the video server, a video image frame sequence corresponding to the speech duration from the template video;

invoking, by the video server, a voice action driving model to correct mouth shape movements of facial images in the video image frame sequence according to the audio data generated corresponding to the speech text/insertion text, and obtaining a corrected image frame sequence; and generating, by the video server, the portrait oral video corresponding to the speech text/insertion text after a time alignment has been performed on the audio data and the corrected image frame sequence.

8. A computer device, comprising:

at least one processor; and a storage device being stored with a computer program, which when executed by the at least one processor, caused the at least one processor to:

respond to an instruction of starting a virtual live streaming, start an e-commerce live streaming room on an e-commerce platform for executing a virtual live streaming activity;

obtain a speech list from a speech server through a speech generation service, the speech list comprising speech texts corresponding to business links of a same live streaming business process;

generate a portrait oral video corresponding to each of the speech texts based on a template video by invoking a video server through a video generation service, the template video having a preset required duration, and each image frame of the template video comprising a facial image collected based on a same person; and implement the virtual live streaming activity by pushing the portrait oral video corresponding to each of the speech texts in the speech list to the e-commerce live streaming room through a virtual camera driving service, according to the live streaming business process.

9. The computer device according to claim 8, wherein the at least one processor implements the virtual live streaming activity by pushing the portrait oral video corresponding to each of the speech texts in the speech list to the e-commerce live streaming room through the virtual camera driving service, according to the live streaming business process, by:

responding to a dynamic insertion instruction triggered in the e-commerce live streaming room, determining an insertion text;

generating a portrait oral video corresponding to the insertion text based on the template video by invoking the video server through the video generation service;

inserting the portrait oral video corresponding to the insertion text after the portrait oral video being pushed to the e-commerce live streaming room.

10. The computer device according to claim 9, wherein the at least one processor responds to the dynamic insertion instruction triggered in the e-commerce live streaming room, determines the insertion text, by:

detecting user input information in the e-commerce live streaming room, and performing an intent recognition on the user input information to determine whether the user input information carries an insertion intent;

triggering the dynamic insertion instruction corresponding to the insertion intent, in response that the user input information carries the insertion intent, and determining an insertion type and an input text corresponding to the insertion intent according to the user input information; and determining an inference text corresponding to the input text from a database corresponding to the insertion type as the insertion text.

11. The computer device according to claim 9, wherein the at least one processor inserts the portrait oral video corresponding to the insertion text after the portrait oral video being pushed to the e-commerce live streaming room, by:

orderly transferring portrait oral videos corresponding to the speech texts in the speech list into a cache queue, according to an order of the business links in the live streaming business process, and pushing the portrait oral videos orderly dequeued from the cache queue to a live streaming server; and detecting a head position of the portrait oral video being dequeued and pushed in the cache queue, and inserting the portrait oral video corresponding to the insertion text into a next position of the head position.

12. The computer device according to claim 8, wherein before the at least one processor obtains the speech list from the speech server through the speech generation service, the at least one processor is further caused to:

acquire a material video with a duration of at least half of the required duration, wherein the material video comprises facial images collected based on the same person;

generate a corresponding reverse video by arranging image frames in the material video in a reverse order; and splice the material video and the corresponding reversed video into the template video for producing the portrait oral video.

13. The computer device according to claim 12, wherein before the at least one processor acquires the material video with the duration of at least half of the required duration, the at least one processor is further caused to:

calculate an interference rate that the virtual live streaming activity in the e-commerce live streaming room interfered by the risk control system of the e-commerce platform;

determine whether the interference rate is not less than a preset threshold value, and trigger an instruction for expanding the material video in response that the interference rate is not less than the preset threshold, updating the required duration by superimposing a fixed duration on the required duration, and use the updated required duration as a recording duration; and respond to the instruction for expanding the material video, start a video recording program and record the material video using the updated required duration for making the template video.

14. The computer device according to claim 13, wherein the at least one processor invokes the video server to generate the portrait oral video corresponding to each speech text of the speech texts based on the template video; or/invokes the video server to generate the portrait oral video corresponding to the insertion text based on the template video, by:

obtaining, by the video server, the speech text/insertion text of a portrait oral video to be generated; invoking, by the video server, an acoustic model to generate audio data of the speech text/insertion text; and determining, by the video server, a corresponding speech duration of the audio data;

extracting, by the video server, a video image frame sequence corresponding to the speech duration from the template video;

invoking, by the video server, a voice action driving model to correct mouth shape movements of facial images in the video image frame sequence according to the audio data generated corresponding to the speech text/insertion text, and obtaining a corrected image frame sequence; and generating, by the video server, the portrait oral video corresponding to the speech text/insertion text after a time alignment has been performed on the audio data and the corrected image frame sequence.

15. A computer program product stored on a non-transitory computer readable medium, comprising a computer program when the computer program is executed by a processor, a method for preventing a false triggering of a live streaming risk control is realized, wherein the method comprises:

responding to an instruction of starting a virtual live streaming, starting an e-commerce live streaming room on an e-commerce platform for executing a virtual live streaming activity;

obtaining a speech list from a speech server through a speech generation service, the speech list comprising speech texts corresponding to business links of a same live streaming business process;

generating a portrait oral video corresponding to each of the speech texts based on a template video by invoking a video server through a video generation service, the template video having a preset required duration, and each image frame of the template video comprising a facial image collected based on a same person; and implementing the virtual live streaming activity by pushing the portrait oral video corresponding to each of the speech texts in the speech list to the e-commerce live streaming room through a virtual camera driving service, according to the live streaming business process.

16. The computer program product according to claim 15, wherein implementing the virtual live streaming activity by pushing the portrait oral video corresponding to each of the speech texts in the speech list to the e-commerce live streaming room through the virtual camera driving service, according to the live streaming business process, comprises:

responding to a dynamic insertion instruction triggered in the e-commerce live streaming room, determining an insertion text;

generating a portrait oral video corresponding to the insertion text based on the template video by invoking the video server through the video generation service;

inserting the portrait oral video corresponding to the insertion text after the portrait oral video being pushed to the e-commerce live streaming room.

17. The computer program product according to claim 16, wherein responding to the dynamic insertion instruction triggered in the e-commerce live streaming room, determining the insertion text, comprises:

detecting user input information in the e-commerce live streaming room, and performing an intent recognition on the user input information to determine whether the user input information carries an insertion intent;

triggering the dynamic insertion instruction corresponding to the insertion intent, in response that the user input information carries the insertion intent, and determining an insertion type and an input text corresponding to the insertion intent according to the user input information; and determining an inference text corresponding to the input text from a database corresponding to the insertion type as the insertion text.

18. The computer program product according to claim 16, wherein inserting the portrait oral video corresponding to the insertion text after the portrait oral video being pushed to the e-commerce live streaming room, comprises:

orderly transferring portrait oral videos corresponding to the speech texts in the speech list into a cache queue, according to an order of the business links in the live streaming business process, and pushing the portrait oral videos orderly dequeued from the cache queue to a live streaming server; and detecting a head position of the portrait oral video being dequeued and pushed in the cache queue, and inserting the portrait oral video corresponding to the insertion text into a next position of the head position.

19. The computer program product according to claim 15, wherein before obtaining the speech list from the speech server through the speech generation service, the method further comprises:

acquiring a material video with a duration of at least half of the required duration, wherein the material video comprises facial images collected based on the same person;

generating a corresponding reverse video by arranging image frames in the material video in a reverse order; and splicing the material video and the corresponding reversed video into the template video for producing the portrait oral video.

20. The computer program product according to claim 19, wherein before acquiring the material video with the duration of at least half of the required duration, the method further comprises:

calculating an interference rate that the virtual live streaming activity in the e-commerce live streaming room interfered by the risk control system of the e-commerce platform;

determining whether the interference rate is not less than a preset threshold value, and triggering an instruction for expanding the material video in response that the interference rate is not less than the preset threshold, updating the required duration by superimposing a fixed duration on the required duration, and using the updated required duration as a recording duration; and responding to the instruction for expanding the material video, starting a video recording program and recording the material video using the updated required duration for making the template video.

\* \* \* \* \*